(12) United States Patent
Takeda

(10) Patent No.: US 6,916,253 B2
(45) Date of Patent: Jul. 12, 2005

(54) GOLF CLUB

(75) Inventor: Hitoshi Takeda, Tsubame (JP)

(73) Assignee: Kabushiki Kaisha Endo Seisakusho (JP)

( * ) Notice: Subject to any disclaimer, the term of this patent is extended or adjusted under 35 U.S.C. 154(b) by 161 days.

(21) Appl. No.: 10/255,866

(22) Filed: Sep. 26, 2002

(65) Prior Publication Data
US 2003/0125132 A1 Jul. 3, 2003

(30) Foreign Application Priority Data
Dec. 28, 2001 (JP) .......................... 2001-399488

(51) Int. Cl.⁷ .......................... A63B 53/04; A63B 53/06
(52) U.S. Cl. ........................................ 473/349; 473/324
(58) Field of Search ................................ 473/334–339, 473/341, 350

(56) References Cited

U.S. PATENT DOCUMENTS

| | | | | |
|---|---|---|---|---|
| 4,667,963 A | * | 5/1987 | Yoneyama | 473/348 |
| 5,385,348 A | * | 1/1995 | Wargo | 473/338 |
| 5,421,577 A | * | 6/1995 | Kobayashi | 473/335 |
| 5,447,311 A | * | 9/1995 | Viollaz et al. | 473/342 |
| 5,564,705 A | | 10/1996 | Kobayashi et al. | |
| 6,080,068 A | * | 6/2000 | Takeda | 473/305 |
| 6,106,412 A | * | 8/2000 | Kosugi et al. | 473/305 |
| 6,162,130 A | * | 12/2000 | Masumoto et al. | 473/324 |
| 6,458,045 B1 | * | 10/2002 | Chen | 473/342 |
| 2001/0055996 A1 | * | 12/2001 | Iwata et al. | 473/350 |

* cited by examiner

Primary Examiner—Gregory Vidovich
Assistant Examiner—Alvin A. Hunter, Jr.
(74) Attorney, Agent, or Firm—Akerman Senterfitt

(57) ABSTRACT

A golf club with hollow construction, having a lowered center of gravity while retaining its inherent features such as a large moment of inertia and a deep position of the center of gravity. A head 1 comprises a face portion 10 for forming a face 3; a head body 11 including a shaft connecting portion 8 and a frame portion 15 joined to a rear peripheral surface of the face portion 10; a rear shell 12 joined to a rear peripheral surface of the frame portion 15. The rear shell 12 forms a hollow portion 17 together with the face portion 10 and the head body 11. The head 1 further includes a balance weight 13 joined to the rear shell 12 on the hollow portion 17 side. Therefore, there can be provided a golf club in which a miss hit leads to a less likelihood of unsuccessful consequence, so that it is easy to use even for beginners.

4 Claims, 2 Drawing Sheets

GOLF CLUB

BACKGROUND OF THE INVENTION

1. Field of the Invention

The present invention relates to a golf club.

2. Description of the Related Art

Heretofore, there have been iron golf clubs with hollow construction, which are characterized by a large moment of inertia and a deep position of the center of gravity. Specifically, even if a ball is hit at a vertically deviated point on a face surface, that is, even in the case of so-called a miss hit, the ball is more easily raised by the club head with hollow construction than by a club head with non-hollow construction, so that the club head with hollow construction is less likely to cause a miss hit. This is because the club head with hollow construction is less likely to sway even if a ball is hit at a spot a little deviated from a centroid of the head due to its large moment of inertia and its vertical gear effect is large due to its deep position of the center of gravity.

However, such club head with hollow construction has had a problem that the center of gravity is liable to become rather too high as compared with a club head with a cavity having an opening on a rear surface. Therefore, it has been impossible to make the best of such features of the club head as the large moment of inertia and the deep position of the center of gravity.

Further, iron golf clubs with a faceplate joined to a head body also have been known art. For example, as shown in FIG. 4, a head 51 may comprise a face portion 53 as a faceplate forming a front face 52 and a head body 55 provided with a shaft connecting portion 54 on one side. The surface of the face 52 of the head body 55 is formed with a recess portion 56 for fitting the face portion 53 therein by machining. After fitting the face portion 53 into the recess portion 53, a joint portion 57 on the surface of the face 52 is welded, so that the face portion 53 and the head body 55 are joined together.

In that case, however, it is imperative to precisely machine the recess portion 56 on the head body 55 so that the face portion 53 may be fitted into the recess portion 56 without a gap. Therefore, higher degree of precision in machining has been required. Further, due to the joint portion 57 being present on the surface of the face 52, there have been constraints that score lines 58 must be formed only inside of the joint portion 57. Moreover, the appearance of the face 52 has been impaired due to the presence of the joint portion 57 on the surface of the face 52. Still further, when forming the recess portion 56, there has been a problem that a gap is prone to be formed in a portion where a rear surface of the face portion 53 abuts against a front surface of the head body 55.

SUMMARY OF THE INVENTION

To solve the above-mentioned problems, it is, therefore, a primary object of the present invention to provide a golf club with hollow construction, which has the lowered center of gravity while retaining known features such as a large moment of inertia and a deep position of the center of gravity.

It is another object of the present invention to provide a golf club with a face portion joined to a head body, which is easy to machine, free from a gap formed in a portion where the face portion abuts against the head body, subject to no positional constraints when forming score lines, and excellent in appearance of a face surface.

According to a first aspect of the present invention, there is proposed a golf club with a shaft connected to a head, said head being provided with a face on a front surface, a shaft connecting portion on one side, a top on an upper surface, and a sole on a lower surface, in which said head comprises: a face portion for forming said face; a head body including said shaft connecting portion and a frame portion joined to a rear peripheral surface of said face portion; a rear shell which is joined to a rear peripheral surface of said frame portion so that said rear shell forms a hollow portion together with said face portion and said head body; and a balance weight joined to the rear shell on said hollow portion side.

According to the construction of the first aspect, there can be provided a golf club with hollow construction, which has a lowered center of gravity while retaining such feature as a large moment of inertia and a deep position of the center of gravity. In other words, it is possible to provide a golf club which has an enlarged sweet area and allows golf balls to be raised more easily so that a miss hit caused by hitting an off-center spot leads to a less likelihood of unsuccessful consequence, thus providing a golf club easy to use for beginners.

According to a second aspect of the present invention, there is proposed a golf club according to the first aspect, in which the face portion and the rear shell are formed from materials having higher strength than that of the head body.

According to the construction of the second aspect, the face portion and the rear shell can be formed thin so that the weight saved by thinning the face portion and the rear shell can be distributed to other portions of the head, thus enhancing degree of freedom in designing the head to provide a high performance golf club.

According to a third aspect of the present invention, there is proposed a golf club according to the first or second aspect, in which said rear shell has an approximately uniform thickness smaller than that of said face portion, said rear shell being provided from the top to the sole on a rear side of said head.

According to the construction of the third aspect, the degree of freedom in distributing the weight of the head can be enhanced by forming the rear shell thinner. Further, the attractiveness of the rear surface of the head can be enhanced by providing the rear shell from the top to the sole on a rear side of the head.

According to a fourth aspect of the present invention, there is proposed a golf club with a shaft connected to a head, said head being provided with a face on a front surface and a shaft connecting portion on one side, in which said head comprises: a face portion for forming said face; and a head body joined to a rear surface of the face portion, said head body being joined to said face portion by welding a peripheral edge portion of said head body.

According to the construction of the fourth aspect, it is possible to provide a golf club which is easy to machine, free from gaps in a portion where the face portion abuts against the head body, subject to no positional constraints for providing score lines, and excellent in appearance of the face surface.

BRIEF DESCRIPTION OF THE DRAWINGS

For a more complete understanding of the present invention, reference is now made to the following description taken in conjunction with the accompanying drawings, in which.

DESCRIPTION OF THE PREFERRED EMBODIMENTS

Figure 1:
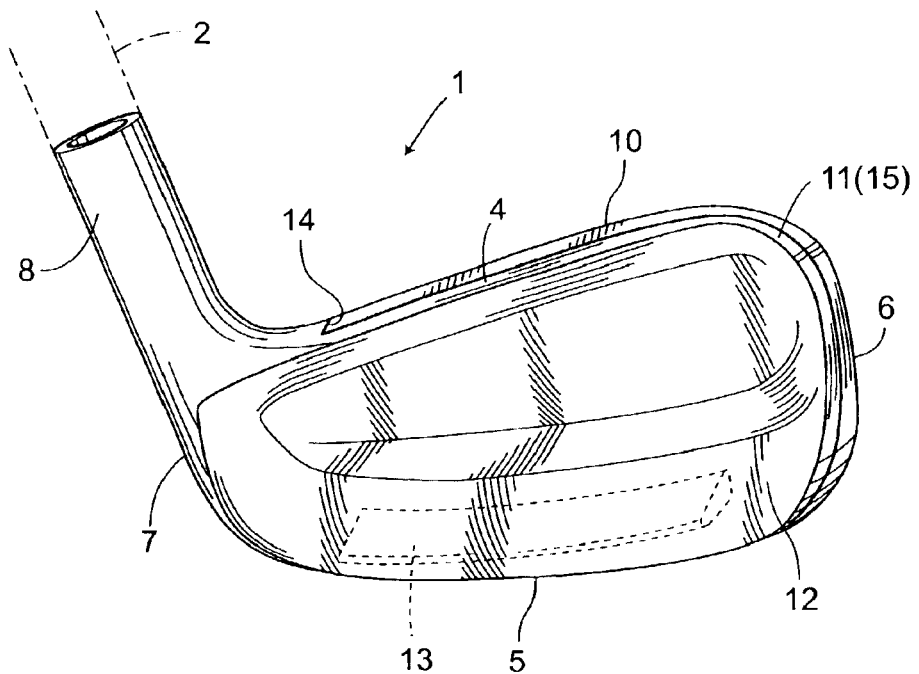
FIG. 1 is a rear view illustrating a golf club according to an embodiment of the present invention.
Figure 2:
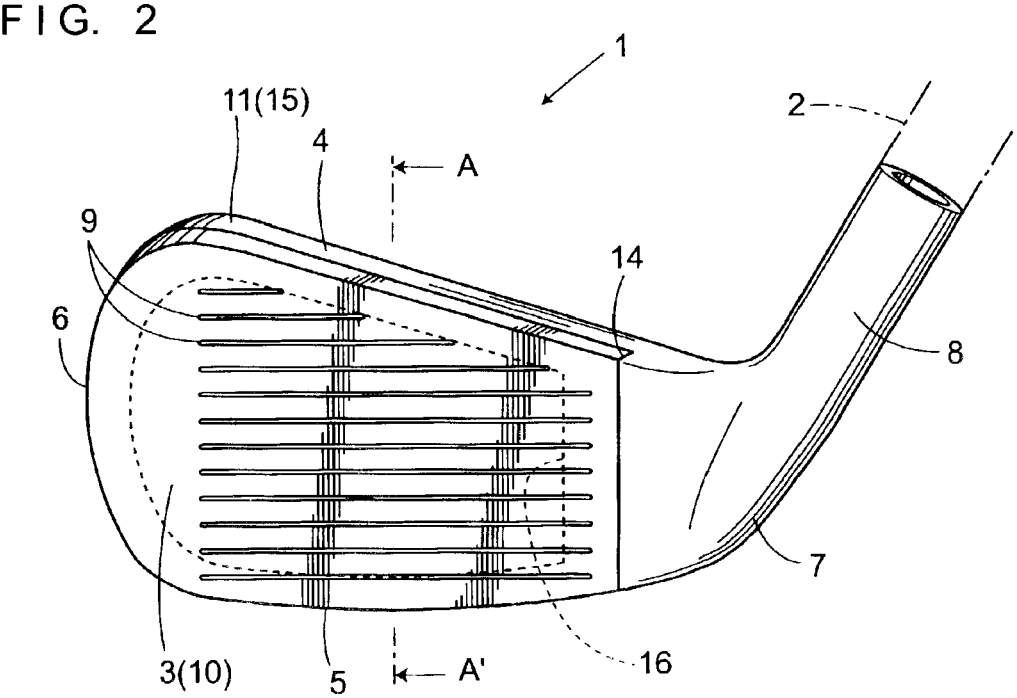
FIG. 2 is a front view illustrating a golf club according to the embodiment of the present invention.
Figure 3:
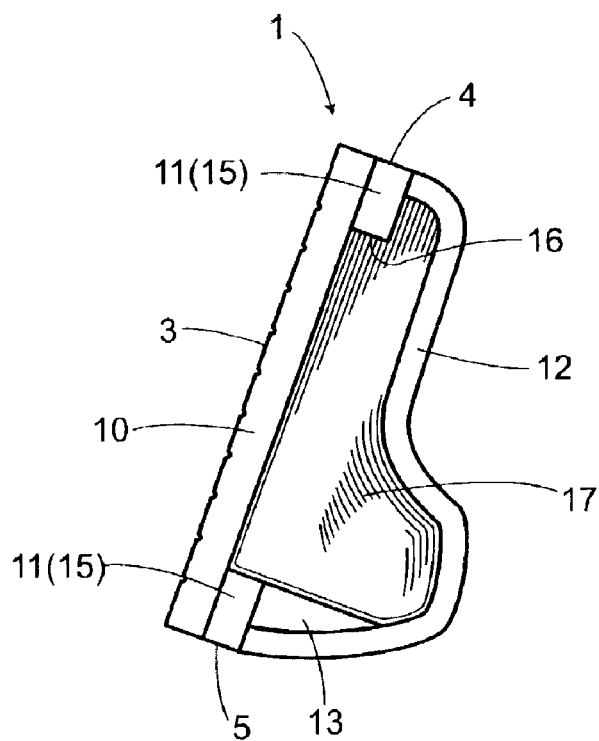
FIG. 3 is a cross-sectional view taken on line A–A' of FIG. 2 illustrating a golf club according to the embodiment of the present invention.
Figure 4:
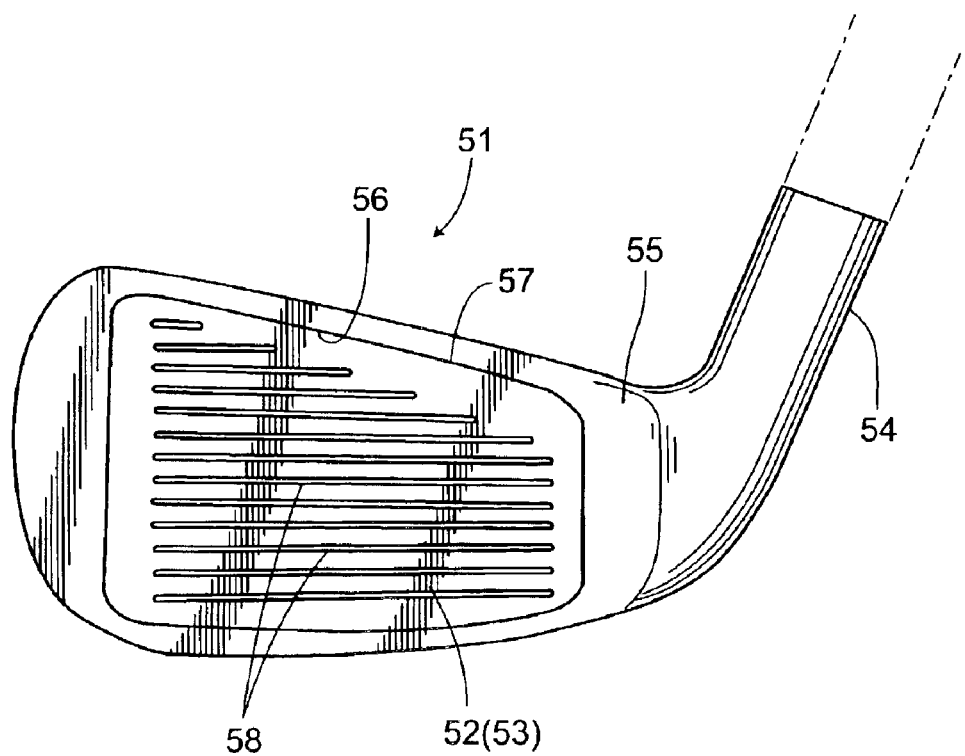
FIG. 4 is a front view illustrating prior art.

Hereunder is a description of embodiments of the present invention with reference to accompanying drawings. FIG. 1 to FIG. 3 show an iron golf club, which is provided with a head 1 and a shaft 2. The head 1 is formed with a face 3 for hitting golf balls (not shown in the drawings) on a front surface, a top 4 on an upper portion of the face 3, a sole 5 on a lower portion thereof, a toe 6 on one side, and a heel 7 on the other side. Further, a shaft connecting portion 8 referred to as a hosel or the like is provided, protruding obliquely upward from an upper portion of the heel 7, while a lower end of the shaft 2 is connected to the shaft connecting portion 8. In the meantime, numeral 9 denotes lateral grooves called score lines formed on the face 3.

The head 1 is constructed by joining a face portion 10, a head body 11, a rear shell 12 and a balance weight 13 together by means of welding. The face portion 10 for forming the face 3 is formed from a plate material of spring steel (SUP-10) of an approximately uniform thickness, having a tabular shape and about 2.5 mm thickness. The head body 11 is formed from low-carbon steel (S20C), including the shaft connecting portion 8 on the other side, a step portion 14 on a front surface corresponding to the face portion 10, and a frame portion 15 corresponding to a rear peripheral surface of the face portion 10. Further, the frame portion 15 is provided with a through hole 16 penetrating from front through back, while the face portion 10 is joined to the frame portion 15 with a front surface of the frame portion 15 abutting against only the rear peripheral surface of the face portion 10. In the meantime, the step portion 14 abuts against an edge surface of the face portion 10 without a gap while the face portion 10 is joined to the head body 11 by welding the peripheral portion of the head body 11.

The rear shell 12 is formed from a plate material of low-carbon steel (S50C) having an approximately 2.0 mm uniform thickness to form a rear surface of the head 1. The rear shell 12 abuts against a rear peripheral surface of the frame portion 15 to be joined thereto, thereby forming a hollow portion 17 inside the head 1, together with the face 10 and the head body 11. The rear shell 12 forms almost an entire portion of the rear surface of the head 1 ranging from the top 4 to the sole 5. The rear shell 12 is formed such that the head 1 takes a wider shape at the sole 5 side than at the top 4 side. The balance weight 13 is made from general purpose steel (SS400), which is joined to the hollow portion 17 side of the rear shell 12.

Among the above-mentioned steel materials, the spring steel (SUP-10) for forming the face 10 is the highest in strength, having a tensile strength of 1,226 Mpa or more after hardening and tempering. Low-carbon steel (S50C) for forming the rear shell 12 is the second highest in strength, having a tensile strength not less than 735 Mpa. Incidentally, low-carbon steel (S20C) for forming the head body 11 is comparatively soft, having a tensile strength of 400 Mpa or above.

Next is a description of manufacturing methods.

In the first place, the outline of the face 3 is punched out from a plate material of spring steel (SUP-10) of 2.5 mm thickness, using a metal stamp so that the face 10 is formed. On the other hand, a prototype (not shown in the drawings) of the head body 11 is formed from a metal material (not shown in the drawings) of low-carbon steel (S20C) by hot forging, using a metal mold. At this moment, a portion corresponding to the frame portion 15 remains tabular. Thereafter, the step portion 14 is formed by cutting process and the through hole 16 is formed by punching process using a metal stamp so that the frame portion 15 is formed. Then, the face 10 is joined to the front surface of the frame portion 15 by means of welding. In the meantime, at the time of the joining step, the joint portion in a peripheral portion of the head body 11 is welded to join the face portion 10 thereto with the step portion 14 abutting against an edge of the face portion 10 without a gap.

Next, a plate material of low-carbon steel (S50C) of 2.0 mm thickness is heated to form the rear shell 12 by drawing process utilizing a metal mold. On the other hand, the balance weight 13 is formed from general purpose steel (SS400) through cold working utilizing a metal mold. The balance weight 13 thus formed is then joined to the rear shell 12 on the hollow portion 17 side by means of welding. Then, the rear shell 12 is joined to the rear peripheral surface of the frame portion 15 by welding.

In a preferred form of the invention, when joining the face portion 10, the head body 11, the rear shell 12 and the balance weight 13 one another, laser welding may be performed utilizing a laser processing machine, as the face portion 10 and the rear shell 12, among others, are so thin that they are prone to be deformed by heat. Laser welding has such advantages that it causes less thermal effect to welding objects so that the thermal distortion of the objects can be minimized, enabling the welding between different kinds of metals, requiring no welding rod, making it possible to automate the welding process through automating programming.

Thereafter, the head 1 is allowed to undergo heat treatment by quenching and tempering so as to adjust the strength and toughness thereof, which is further subjected to grinding and plating process to be finished.

In the meantime, shotpeening may be applied to the spring steel used for the face portion 10 in order to enhance its fatigue strength, as such treatment is recognized as useful for that purpose. However, it is necessary to pay attention not to cause deflection by the stress developed at the time of shotpeening as the face portion 10 of the present embodiment is such a thin member.

According to the foregoing embodiment of the invention, there can be provided a golf club with hollow construction, which has a lowered center of gravity while retaining such hollow structure advantages such as a large moment of inertia and a deep position of the center of gravity. In other words, it is possible to provide a golf club which has an enlarged sweet area and allows golf balls to be raised more easily so that a miss hit caused by hitting an off-center spot leads to a less likelihood of unsuccessful consequence, thus providing a golf club easy to use for beginners. Beside, as the frame portion 15 and the shaft connecting portion 8 are integrated to form the head body 11, it is possible to determine the respective values of a loft angle and a lie angle to a certain extent in advance when forming the head body 11.

Further, as said face portion 10 and said rear shell 12 are formed from materials having higher strength than that of said head body 11, the face portion 10 and the rear shell 15 are able to be formed thin so that the weight thus saved can be distributed to other portions of the head 1, thus enabling the provision of a golf club with enhanced flexibility in designing the head 1 and with high performance. Further, spring effect of the face portion 10 at the time of hitting golf balls is enhanced by forming the face portion 10 thin, being able to improve resilient performance of the face portion 10. Moreover, the head body 11 is lower in strength than other portions to be easily bent, giving easy adjustment of a loft angle and a lie angle.

According to the third aspect of the present invention, thickness of said rear shell 12 is nearly uniform and is thinner than that of said face portion 10, while said rear shell 12 is formed ranging from said top 4 of a rear surface of said head 1 to said sole 5 of it. Therefore, flexibility in weight distribution of the head 1 can be enhanced through forming the rear shell 12 thinner, while the rear shell 12 is formed ranging from the top 4 of the rear surface of the head to the sole 5 of it, so that the rear surface of the head 1 can be improved in appearance.

The fourth aspect of the present invention is a golf club with a shaft 2 connected to a head 1 which is provided with a face 3 on a front surface and a shaft connecting portion 8 on one side, in which said head 1 comprises a face portion 10 forming said face 3 and a head body 11 joined to a rear surface of the face portion 10, while said face portion 10 and said head body 11 are joined together by welding a peripheral portion of said head body 11 so that a portion, where the face portion 10 of the head body 11 is joined, can be machined only by a plane milling cutting process, allowing easy machining, which can enhance degree of machining accuracy with ease so that no joint gap is formed at a portion where the face portion 10 abuts against the head body 11. Moreover, since the portion where the face portion 10 and the head body 11 joined by means of welding is not on the face surface 3 but on the peripheral portion of the head body 11, a golf club can be provided where there is no constraint on an area where score lines 9 are formed and the face 3 excels in appearance.

The present invention should not be limited to the above-mentioned embodiments but may be modified within the scope of the present invention.

For example, although an iron golf club is described as an example in the aforementioned embodiment, the present invention should not be limited to an iron golf club but may be applied to a wood golf club as well. Further, the kind of spring steel for forming the face portion 10 should not be limited to SUP10 but may be other kind of spring steel. The material of the head body 11 should not be limited to S20C but may be other iron-based material, stainless steel, titanium-based alloy or the like.

Although all the components of the head are formed from iron-based materials in the aforementioned embodiments, other different kinds of materials may be used for each component of the head. For example, if the head body, the face portion and the rear shell are formed from lighter materials such as titanium, titanium alloy or the like while the balance weight is formed from denser material such as tungsten or the like, it becomes possible to more effectively adjust the center of gravity, thus enabling various modified embodiments.

What is claimed is:

1. A golf club with a shaft connected to a head, said head being provided with a face on a front surface, a shaft connecting portion on one side, a top on an upper surface, and a sole on a lower surface, said head comprising:

a face portion for forming said face;

a head body including said shaft connecting portion and a frame portion joined to a rear peripheral surface of said face portion;

a rear shell which is joined to a rear peripheral surface of said frame portion so that said rear shell forms a hollow portion together with said face portion and said head body; and a balance weight joined to the rear shell on said hollow portion side, wherein:

said face portion is formed from a single plate material having an approximately uniform thickness; and a portion where said face portion and said head body are joined is not on said face surface but on a peripheral portion of said head body, wherein said face portion and said rear shell are formed from materials having higher strength than that of said head body.

2. A golf club according to claim 1, wherein said rear shell has an approximately uniform thickness smaller than that of said face portion, said rear shell being provided from the top to the sole on a rear side of said head.

3. A golf club according to claim 2, wherein said rear shell is formed such that said head takes a wider shape at the sole side than at the top side.

4. A golf club according to claim 1, wherein:

said face portion is made from spring steel;

said head body is made from low carbon steel; and said rear shell is made from low carbon steel having higher strength than that of said head body.

* * * * *